(12) United States Patent
Abdelaziz et al.

(10) Patent No.: US 7,788,522 B1
(45) Date of Patent: Aug. 31, 2010

(54) AUTONOMOUS CLUSTER ORGANIZATION, COLLISION DETECTION, AND RESOLUTIONS

(75) Inventors: Mohamed M. Abdelaziz, Santa Clara, CA (US); Bernard Traversat, Menlo Park, CA (US); Shreedhar Ganapathy, Sunnyvale, CA (US); Lawrence White, Redwood City, CA (US); Abhijit Kumar, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 505 days.

(21) Appl. No.: 11/756,480

(22) Filed: May 31, 2007

(51) Int. Cl.
G06F 11/00 (2006.01)
(52) U.S. Cl. .......................... 714/4; 709/209
(58) Field of Classification Search ............ None
See application file for complete search history.

(56) References Cited

U.S. PATENT DOCUMENTS

| | | | | |
|---|---|---|---|---|
| 5,729,686 | A * | 3/1998 | Heck et al. | 709/208 |
| 6,192,397 | B1 * | 2/2001 | Thompson | 709/209 |
| 6,401,120 | B1 * | 6/2002 | Gamache et al. | 709/226 |
| 6,484,221 | B1 * | 11/2002 | Lorinser et al. | 710/200 |
| 6,597,956 | B1 * | 7/2003 | Aziz et al. | 700/3 |
| 7,461,130 | B1 * | 12/2008 | AbdelAziz et al. | 709/208 |
| 2008/0071878 | A1 * | 3/2008 | Reuter | 709/208 |
| 2008/0177741 | A1 * | 7/2008 | Joshi et al. | 707/8 |
| 2008/0281938 | A1 * | 11/2008 | Rai et al. | 709/209 |
| 2009/0225774 | A1 * | 9/2009 | Oksman | 370/458 |

OTHER PUBLICATIONS

Kolam, Hairharan et al., "Implementation of offline-restart flavor of dependency in High Availability Clusters," Research Disclosure Journal, Nov. 2006, 7 pgs, Kenneth Mason Publications Ltd., Wesbourne, Hants UK.
Abdelaziz, Mohamed, Blog, "Shoal Dynamic Clustering" http://weblogs.java.net/blog/hamada/archive/2006/11/index.html, Aug. 2005, 2 pages (accessed Aug. 17, 2007).
JXTA Community Project, https://jxta.dev.java.net, 3 pages (accessed Aug. 17, 2007).
JXTA, from Wikipedia, the free encyclopedia, http://en.wikipedia.org/wiki/Jxta, 4 pages (accessed Aug. 17, 2007).
Traversat, Bernard et al., "Project JXTA 2.0 Super-Peer Virtual Network," Project JXTA, Sun Microsystems, Inc., 20 pages, May 25, 2003.

* cited by examiner

*Primary Examiner*—Christopher S McCarthy
(74) *Attorney, Agent, or Firm*—Osha • Liang LLP

(57) ABSTRACT

A method, apparatus, and system are directed toward managing cluster membership through a discovery process that enables selection of a master for the cluster. If a node on a network is the first to initiate the discovery process, it assumes the master role. Where two or more nodes enter the discovery process at the same time, or where a cluster is disjointed, views of the potential members to the cluster are shared among the nodes. Each node coalesces and sorts the views. The master may then be determined from the sorted views. In one embodiment, the master is that node in the results having a highest unique identifier. The identified master sends an assertion of its role to the other nodes. If no assertion is received, or multiple assertions are received, updated views are again shared and sorted. In one embodiment, the nodes may be within a peer-to-peer network.

20 Claims, 6 Drawing Sheets

```
<?xml version="1.0" encoding="UTF-8"?>
<Member Advertisement>
        <Name> name of node </Name>
        <Keywords> search keywords </Keywords>
        <Pid> Node identifier </Pid>
        <Services>
                <service advertisement>
                ...
                </service advertisement>
        </Services>
        <Endpoints>
                <endpoint advertisement>
                ...
                </endpoint advertisement>
        </Endpoints>
        <Initial App>
                <service advertisement>
                ...
                </service advertisement>
        </Initial App>
</Member Advertisement>
```

602

```
<?xml version="1.0" encoding="UTF-8"?>
<ClusterView Advertisement>
        <Name> name of Cluster </Name>
        <Keywords> search keywords </Keywords>
        <Cid> Cluster identifier </Cid>
        <Services>
                <Member advertisement>
                ...
                </Member advertisement>
        </Services>
        <Initial App>
                <Member advertisement>
                ...
                </Member advertisement>
        </Initial App>
</ClusterView Advertisement>
```

AUTONOMOUS CLUSTER ORGANIZATION, COLLISION DETECTION, AND RESOLUTIONS

TECHNICAL FIELD

The present invention relates generally to network communications, and more particularly, but not exclusively, to managing master selection and health detection of nodes in a cluster.

BACKGROUND

The Internet has evolved into a ubiquitous network that has inspired many companies to rely upon it as a major resource for doing business. For example, many businesses may utilize the Internet, and similar networking infrastructures, to manage critical applications, access content servers, automate assembly and production lines, and implement complex control systems. Such reliance by businesses has driven the demand for higher protection and availability guarantees to resources over the network.

In response to the need for a networking infrastructure that provides both high availability of system resources and protection from failures, a cluster architecture was developed. A cluster can be defined as multiple loosely coupled network devices that cooperate to provide client devices access to a set of services, resources, and the like, over the network. A cluster is configured such that in many respects they can be viewed as though they are a single computer to client devices.

A variety of different types of clusters have evolved, including high availability (HA) clusters, high performance clusters, load balanced clusters, and the like. Examples of clustering systems include the Veritas™ Cluster Server, HP Serviceguard, and/or Microsoft Cluster Server. High Availability clusters are a class of coupled distributed systems that provide high availability for applications typically by using hardware redundancy to recover from single points of failure. HA clusters typically include multiple nodes that interact with each other to provide users with various applications and system resources as a single entity. Each node typically runs a local operating system kernel.

In a typical cluster at least one of the nodes is designated as a master (or coordinating) node of the cluster, while the other nodes are typically known as members (or sometimes, slaves) of the cluster. In a typical cluster, the master node is configured to manage scheduling of tasks to members within the cluster, coordinate membership to the cluster, and related network management issues. The members of the cluster, sometimes known as slaves, are configured typically to perform scheduled tasks for a client device.

Selection of the master when a cluster is initially formed or when an existing master node within a cluster fails is of major concern to a cluster architecture. However, such selection of the master often remains complex and time-consuming, resulting in lost time and money while the cluster becomes useful to client devices. Traditional static approaches to initially forming or re-establishing a cluster often suffer from a single point of failure, and may require human intervention to maintain. Traditional dynamic approaches may be difficult to achieve due to burdens often imposed by them on network resources or a lack of universal uniqueness on the network. Thus, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 6 illustrates embodiments various advertisements usable within a cluster network, in accordance with the present invention.

DETAILED DESCRIPTION

Figure 1:
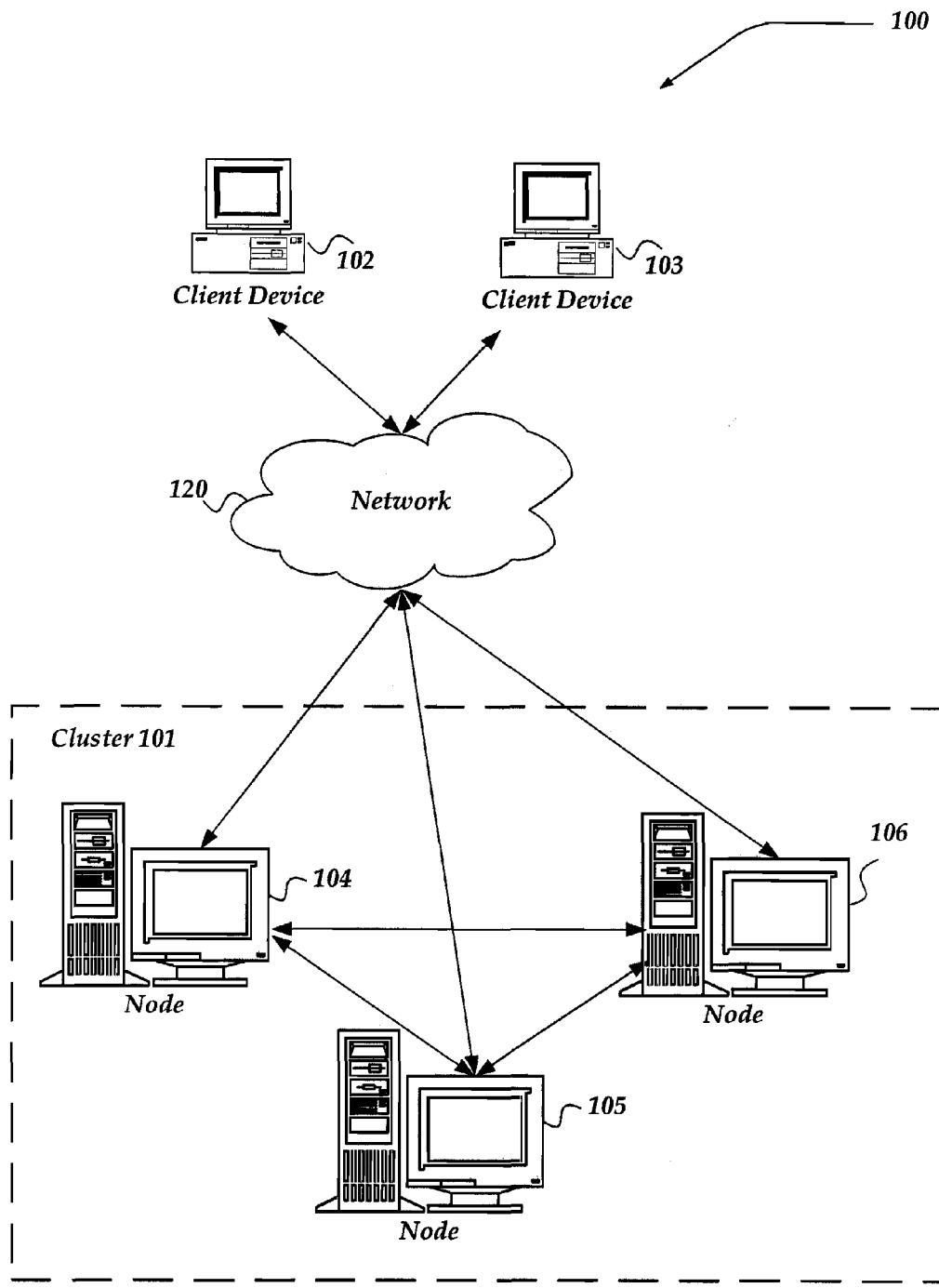
FIG. 1 is a system diagram of one embodiment of an environment in which the invention may be practiced.

The invention now will be described more fully hereinafter with reference to the accompanying drawings, which form a part hereof, and which show, by way of illustration, specific exemplary embodiments by which the invention might be practiced. This invention might, however, be embodied in many different forms and should not be construed as limited to the embodiments set forth herein; rather, these embodiments are provided so that this disclosure will be thorough and complete, and will fully convey the scope of the invention to those skilled in, the art. Among other things, the invention might be embodied as methods or devices. Accordingly, the invention might take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it might. As used herein, the term "or" is an inclusive "or" operator, and is equivalent to the term "and/or," unless the context clearly dictates otherwise. The term "based on" is not exclusive and allows for using additional factors not described, unless the context clearly dictates otherwise. In addition, throughout the specification, the meaning of "a," "an," and "the" include plural references. The meaning of "in" includes "in" and "on."

As used throughout this application, the word "may" is used in a permissive sense (i.e., meaning have the potential to), rather than the mandatory sense (i.e., meaning must). Similarly, the words "include," "including," and "includes" mean including, but not limited to.

The term "network connection" refers to a collection of links and/or software elements that enable a computing device to communicate with another computing device over a network. One such network connection might be a TCP connection. TCP connections are logical connections between two network nodes, and are typically established through a TCP handshake protocol. The TCP protocol is described in more detail in Request for Comments (RFC) 793, which is available through the Internet Engineering Task Force (IETF). A network connection "over" a particular path or link refers to a network connection that employs the specified path or link to establish and/or maintain a communication.

The term "node" refers to a computing element that is one logical part of a network. A node might be a virtual operating environment or virtual machine. Examples of virtual cluster nodes include Solaris™ containers or zones, IBM™ virtual machines, Solaris™ Logical Domains (LDOMs), Xen™ domains, VMware™ "virtual machines" or the like. In one embodiment, a node might be connected to other nodes within a network. A node might be a physical device (i.e., a physical node), such as a computer, or the like, or a virtual operating environment running on a physical device (i.e., a virtual node).

As used herein, the term "cluster" refers to multiple loosely coupled network devices (or nodes) that cooperate to provide client devices access to a set of services, resources, and the like, over the network. A cluster is configured such that in many respects they can be viewed as though they are a single computer (or node) to the client devices.

As used herein, the terms "cluster resource" or "resource in a cluster" refers to a node of the cluster, a service provided by a node in the cluster, or the cluster itself (e.g., every node in the cluster).

As used herein, the term "peer" refers to a network device or service within a peer-to-peer (P2P) system. Peers may include peers in Centralized P2P network such as Napster, Decentralized P2P network such as KaZaA, Structured P2P network such as Content Addressable Network (CAN), Unstructured P2P network such as Gnutella, Hybrid P2P network (Centralized and/or Decentralized) such as JXTA, or the like.

JXTA (Juxtapose) is P2P standard described in more detail in Project JXTA 2.0 Super-Peer Virtual Network, by Berndard Traversat, et al., May 25, 2003, which is incorporated herein by reference. JXTA utilizes a set of XML based protocols that allow any device connected to a network to exchange messages and collaborate in spite of the network topology. JXTA enables a range of devices (e.g., PCs, mainframes, cell phones, PDAs) to communicate in a decentralized manner. JXTA may be implemented as bindings in a variety of computer languages, including JAVA, C/C++, or the like.

A JXTA system maps a peer to a device in a network. Thus, JXTA networks of peers create a virtual overlay network that allows a peer to interact with other peers directly even when some of the peers are behind firewalls, NATs, use different network transports, or the like. In one embodiment, a JXTA system may be used to implement a cluster network, although the present invention is not limited to a JXTA, or other P2P implementation. One embodiment of using a JXTA system for cluster networks, however, is described in a co-pending patent application Ser. No. 11/756,494, entitled "Method And Apparatus For Encoding And Mapping Of Virtual Addresses For Clusters," to Mohamed M Abdelaziz, et al., which is hereby incorporated herein by reference.

Briefly stated, the present invention is directed towards managing cluster membership through a discovery process that enables selection of a master for the cluster. If a node on a network is the first to initiate the discovery process, it assumes the master role. Where two or more nodes enter the discovery process at the same time, or where a cluster is disjointed, views of the potential members to the cluster are shared among the nodes. Such views are anticipated to include a list of those nodes for cluster known by another node. Each node coalesces and sorts the views received. The master may then be determined from the sorted views. In one embodiment, the master for the cluster is selected as that node being first in the sorted view results. Thus, in one embodiment, the master is that node in the sorted results having a highest unique identifier. However, the master node may also be identified based on a node identified within the sorted results having a lowest numeric value for their unique identifier. The identified master sends an assertion of its role to the other nodes. If no assertion is received, or multiple assertions are received, updated views may again be shared, coalesced, sorted, and re-examined to identify a master node for the cluster. Multiple assertions may arise, for example, where nodes receive incomplete cluster views, enter the discovery process simultaneously, or the like.

Moreover, the present invention further provides services to determine health status of cluster members. As disclosed, members provide at least one health message to other members with the cluster. In one embodiment, the members employ the cluster view to determine nodes within the cluster. If a member fails to receive a health message within a determined time period, and/or after a defined number of timeout intervals for another member, the non-responsive member may be marked as in an "in doubt" state. In one embodiment, the master sends an announcement indication that the member is in doubt to the other members. If the master is the in doubt node, each member marks their cluster view records, accordingly. If after a predefined failure verification interval, the in doubt member is still in doubt, it is then identified as a failed node, and the cluster views are updated. Where the failed node is the master node for the cluster, a new master may be identified based on the inventive approach described herein.

In one embodiment, the cluster nodes may be within a peer-to-peer network. For example, the peer-to-peer network may include those described within the JXTA platform. However, the invention is not so constrained, and other network structures or architectures may also be used, without departing from the scope of the invention.

The inventive master selection and health monitoring as disclosed herein are directed towards enabling dynamic and autonomous cluster formation and management that, among other things, enables a seamless discovery and cluster formation; enables independent recovery from network and/or application failures; and thus, provides a foundation approach to fault tolerant cluster network structures.

Illustrative Operating Environment

FIG. 1 shows block diagrams illustrating two embodiments of environments for practicing the invention. However, not all of these components might be required to practice the invention, and variations in the arrangement and type of the components might be made without departing from the spirit or scope of the invention. As shown in the figure, system 100 of FIG. 1 includes client devices 102-103, network 120, and nodes 104-106. As shown, nodes 104-106 may participate in cluster 101. In one embodiment, cluster 101 might be a high availability (HA) cluster, a high performance cluster, a load balanced cluster, or the like. However, in one embodiment, cluster 101 may not yet be formed. As such, nodes 104-106 may be network devices, services, applications, or the like, within a network, such as network 120, a P2P network, or the like. In one embodiment, however, nodes 104-106 ma include information indicating that they are associated with a cluster network, such as cluster 101.

Generally, client devices 102-103 might include virtually any computing device capable of connecting to another computing device to send and receive information, including web requests for information from a server device, or the like. The set of such devices might include devices that typically connect using a wired communications medium such as personal computers, multiprocessor systems, microprocessor-based or programmable consumer electronics, network PCs, or the like. The set of such devices might also include devices that typically connect using a wireless communications medium such as cell phones, smart phones, radio frequency (RF) devices, infrared (IR) devices, integrated devices combining one or more of the preceding devices, or virtually any mobile device. Similarly, client devices 102-103 might be any device that is capable of connecting using a wired or wireless communication medium such as a PDA, POCKET PC, wearable computer, or any other device that is equipped to communicate over a wired and/or wireless communication medium.

Client devices 102-103 might further include a client application that is configured to manage various actions. Moreover, client devices 102-103 might also include a web browser application that is configured to enable an end-user to interact with other devices and applications over network 120. For example, in one embodiment, client devices 102-103 might seek to access resources that may be managed by nodes 104-106 within cluster 101. Thus, client devices 102-103's client application may be configured to employ any of a variety of communication protocols to request a resource, from at least one of the nodes within cluster 101.

Client devices 102-103 might communicate with network 120 employing a variety of network interfaces and associated communication protocols. Client devices 102-103 might, for example, use various dial-up mechanisms with a Serial Line IP (SLIP) protocol, Point-to-Point Protocol (PPP), any of a variety of Local Area Networks (LAN) including Ethernet, AppleTalk™, WiFi, Airport™, or the like.

Network 120 is configured to couple client devices 102-103, with other network devices, such as nodes 104-106, or the like. Network 120 is enabled to employ any form of computer readable media for communicating information from one electronic device to another. In one embodiment, network 120 might include the Internet, and might include local area networks (LANs), wide area networks (WANs), direct connections, such as through a universal serial bus (USB) port, other forms of computer-readable media, or any combination thereof. On an interconnected set of LANs, including those based on differing architectures and protocols, a router might act as a link between LANs, to enable messages to be sent from one to another. Also, communication links within LANs typically include twisted wire pair or coaxial cable, while communication links between networks might utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 120 might further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks might enable wide area coverage for network devices, such as client devices 102-103, or the like, with various degrees of mobility. For example, network 120 might enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, network 120 includes any communication method by which information might travel between one network device and another network device.

Additionally, network 120 might include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, or other wired media and wireless media such as, but not limited to, acoustic, RF, infrared, or other wireless media.

One embodiment of a network device that could be used as nodes 104-106 is described in more detail below in conjunction with FIG. 2. Briefly, however, nodes 104-106 might include any computing device capable of communicating packets to another network device. Each packet might convey a piece of information. A packet might be sent for handshaking, i.e., to establish a connection or to acknowledge receipt of data. The packet might include information such as a request, a response, or the like. Generally, packets received by nodes 104-106 might be formatted according to TCP/IP, but they could also be formatted using another transport protocol, such as SCTP, UDP, NetBEUI, IPX/SPX, token ring, similar IPv4/6 protocols, or the like. Moreover, the packets might be communicated between nodes 104-106 and client devices 102-103 employing HTTP, HTTPS, or any of a variety of current or later developed protocols.

In one embodiment, nodes 104-106 might be configured to operate as a website server. However, nodes 104-106 are not limited to web server devices, and might also operate a messaging server, a File Transfer Protocol (FTP) server, a database server, content server, or the like. Additionally, each of nodes 104-106 might be configured to perform a different operation.

Devices that might operate as nodes 104-106 include personal computers, desktop computers, multiprocessor systems, microprocessor-based or programmable consumer electronics, network PCs, server devices, network appliances, or the like.

As shown, cluster 101 includes nodes 104-106. However, cluster 101 is not limited to the nodes shown in FIG. 1. Thus, nodes may be added or deleted from cluster 101 based on a variety of criteria, conditions, or the like. Cluster 101 may operate as any of a variety of cluster types, including a high availability cluster, a high performance cluster, a load balanced cluster, and the like. Moreover, cluster 101 may be initially formed from a single node membership, such as might arise during initialization or initial creation of the cluster. Typically, cluster 101 and its members may be identified based on a unique cluster identifier. Communications between members within cluster 101 may then be performed using the cluster identifier.

Virtually any node within nodes 104-106 may be configured to operate as a cluster master, while the remaining nodes within cluster 101 may be configured to operate as a member node within cluster 101. The master node may provide, among other things, cluster leadership and/or cluster state management for cluster 101. For example, in one embodiment, the master node may determine which nodes may or may not be a member of the cluster. The master node may also manage communications with members and/or allocate workload across the cluster membership, in a manner such that client devices are serviced as if the service is provided from a single entity. Thus, the master node may be considered as the initiator of an authoritative view of the cluster. For example, in one embodiment, while each member of the cluster may maintain a view of the cluster, an authoritative cluster view is maintained and distributed by the cluster master. In one embodiment, cluster views, and other information about the members within the cluster may be distributed using advertisement messages. In one embodiment, such advertisements may be broadcast to other members and/or nodes. However, advertisements may also be sent using any of a variety of other communication protocols, without departing from the scope of the invention. Further description of the role of the master, and how it may be selected is described below.

In one embodiment, nodes 104-106 of cluster 101 may be an overlay on peers within a peer-to-peer (P2P) network. Thus, in one embodiment, the cluster may operate within a P2P network framework, such as JXTA, or the like. However, cluster 101 is not so constrained to P2P network architectures, and virtually any other architecture may be used by the invention, without departing from the scope of the invention.

Illustrative Cluster Member Configuration

Figure 2:
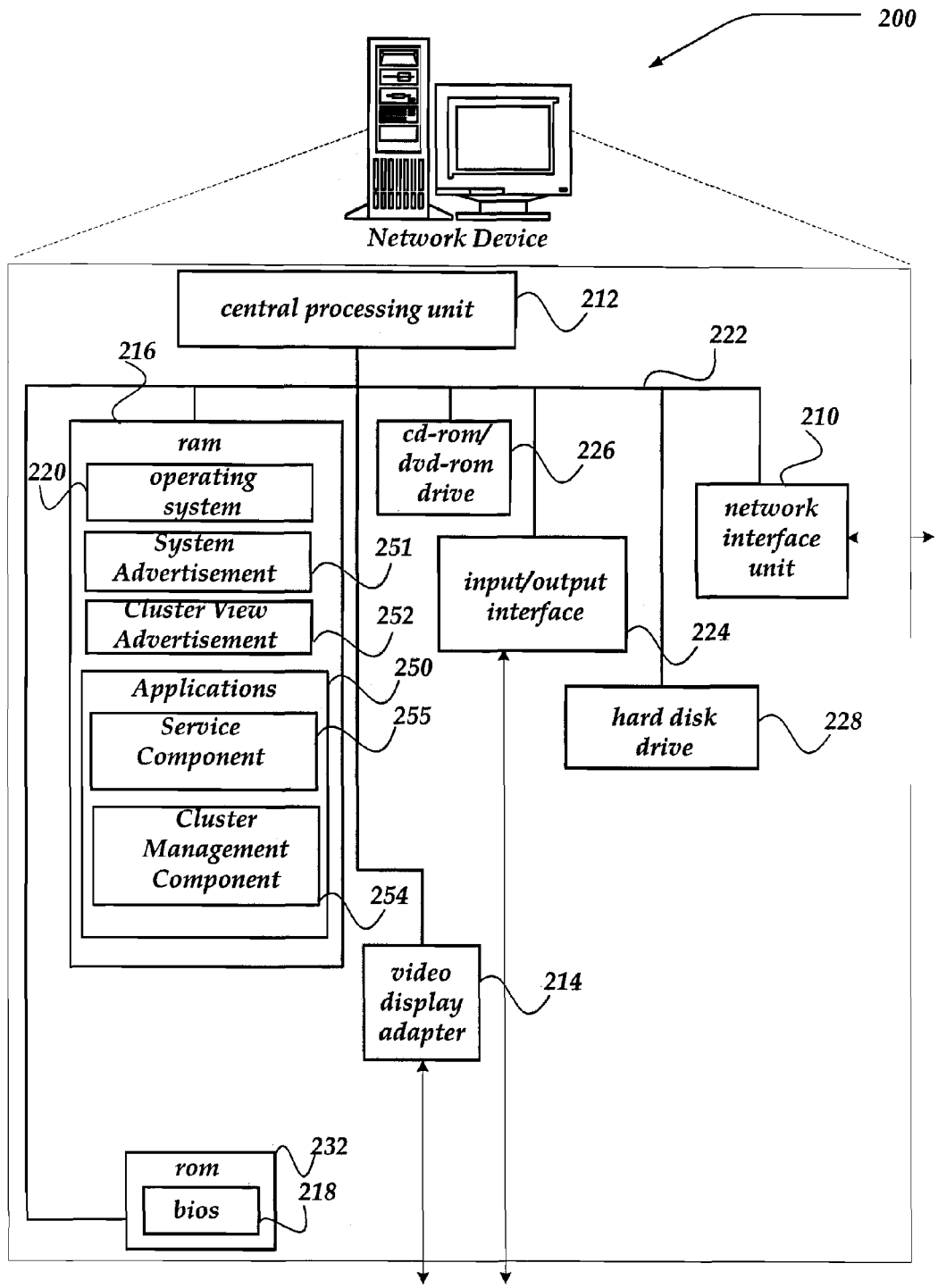
FIG. 2 shows one embodiment of a network device usable as a member to a cluster network.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, nodes 104-106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs within applications 250 may include transcoders, schedulers, calendars, database programs, word processing programs, HTTP programs, customizable user interface programs, IPSec applications, encryption programs, security programs, VPN programs, SMS message servers, web servers, IM message servers, email servers, account management and so forth. Mass memory also includes system advertisement 251 and cluster view advertisement 252. Applications 250 also include service component 255 and cluster management component 254.

Figure 3:
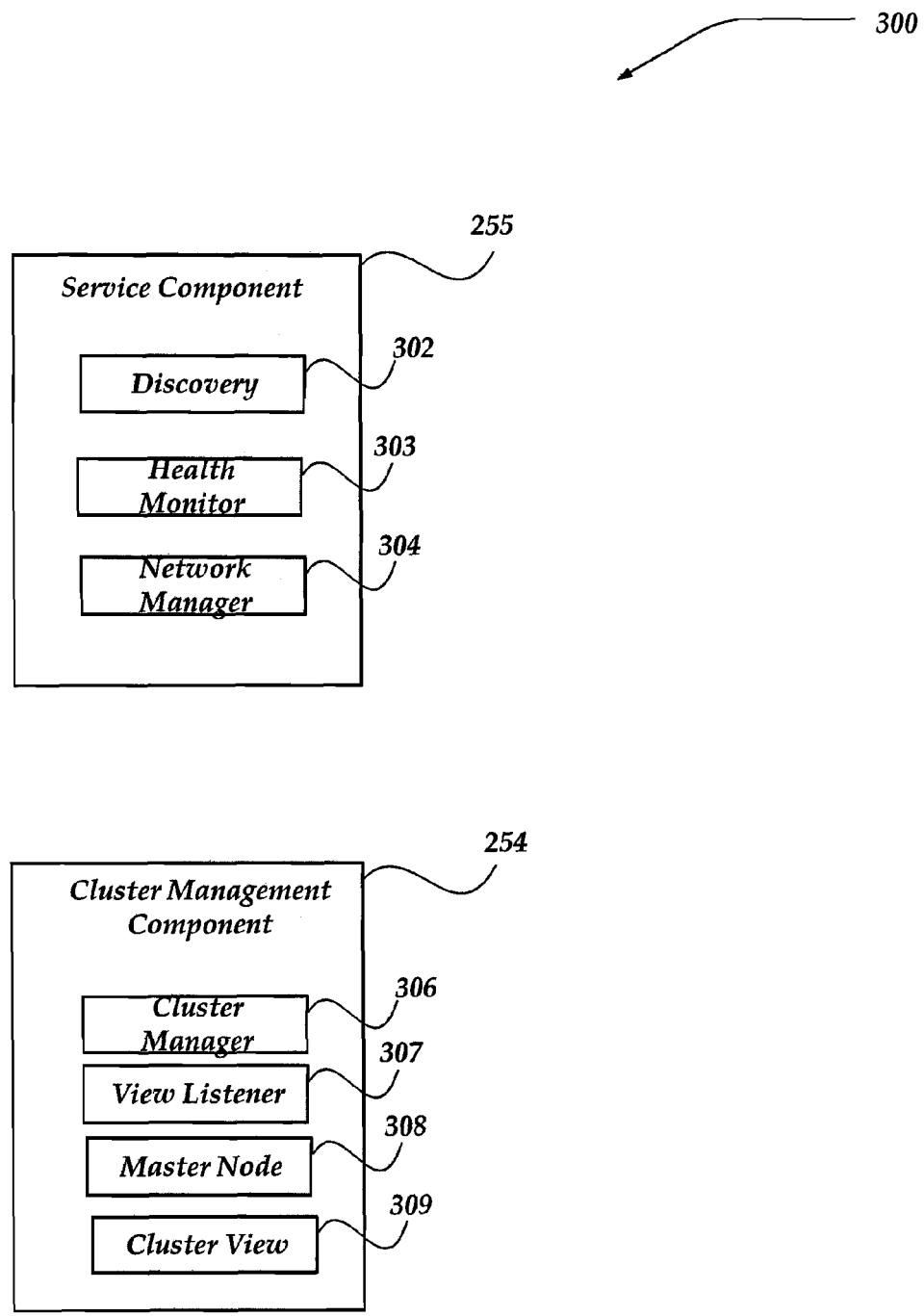
FIG. 3 shows one embodiment of expanded selected components within the network device of FIG. 2.

One embodiment of cluster management component 254 is illustrated in more detail in FIG. 3. Thus, referring to FIG. 3 for components 300, cluster management component 254 includes cluster manager 306, view listener 307, and master node 308. Cluster manager 306 is configured and arranged to manage a primary bootstrapping of network device 200. In one embodiment, cluster manager 306 may, for example, initialize services relevant to a cluster management configuration on a given node. In one embodiment, such services may be related to a P2P configuration, such as JXTA, or the like. However, the invention is not so constrained and other cluster management services, or the like, may also be initialized. In any event, cluster manager 306 may perform lifecycle operations such as starting cluster management services, waiting for closure, stopping services when necessary. Such actions are typically performed by each member node as it may join a cluster.

Cluster management component 254 may employ a parameter, such as a logical member name, that is arranged to provide a constant identity to a node across various lifecycles. A cluster membership may theoretically be as large as an entire connected network. Naming anything uniquely, therefore, may be a challenge. Therefore, the present invention may support and/or provide various naming and binding services. In one embodiment, the invention may use a universal unique identifier (UUID), for example, a 64- or 128- bit datum, to refer to an entity, such as a node, a cluster, or the like. In one embodiment, the UUID may be generated by any hash algorithm, including a SHA-1 (e.g., 160 bit) algorithm, MD5, RACE Integrity Primitives Evaluation Message Digest (RIPMED), or the like. The UUID may also be a Uniformed Resource Name (URN), or the like. In any event, each entity is associated with a unique UUID within a local runtime environment and serves as a canonical way of referring to an entity, such as network device 200, cluster 101, or the like.

UUIDs may be included within an advertisement for network device 200, or other nodes, as well as advertisements for a cluster. Examples of advertisements for a node, such as network device 200, and for a cluster view are described in more detail below in conjunction with FIG. 6.

Cluster management component 254 may also employ other parameters such as a principal/key password to create self-signed node certificates, a properties object that may include additional application configurable parameters such as a specific interface addresses, port numbers, failure detection timeouts, or the like.

Cluster view 309 is configured to present and maintain a cluster's composition state. In one embodiment, such state may be maintained in cluster view advertisement 252. Cluster view 309 may expose an Application Programming Interface (API), script, applet, or the like, that is configured to add, remove, and/or query contents of cluster view advertisement 252. Thus, cluster view advertisement 252 may include a collection of system advertisements of all members within the cluster. In one embodiment, cluster view 309 may include an API, script, applet, or the like, for marking a member of a cluster as a master node for a cluster, as well as enabling an independent determination of a master node candidate using, for example, a mechanism such as described below.

Network devices, such as members of the cluster, interested in notification of a cluster view advertisement to obtain a view of a cluster's composition may, in one embodiment, register through view listener 307 to receive such events. In one embodiment, cluster view 309 maintains a list of such listeners and notifies each listener on occurrence of a cluster view change event. In one embodiment, notification may be achieved by sending a cluster view advertisement 252. In one embodiment, such cluster view advertisement 252 may be broadcast over a network.

In one embodiment, cluster view 309 may create a cluster view advertisement 252 using an initializing node's system advertisement. Thus, in one embodiment, cluster view 309 may create a first entry in its records for network device 200 by adding its own system advertisement. Subsequently, as new nodes are discovered, cluster view 309 may update cluster view advertisement 252. Moreover, if a master node for a cluster is discovered or appointed, then this information may also be included within cluster view advertisement 252, and registered listeners may be notified.

Master node 308 is configured to perform cluster leadership and/or cluster state management. Master node 308 enables virtually any node, including network device 200, to become a cluster master, an authoritative decision maker about membership and activities within the cluster. In one embodiment, master node 308 may operate as an initiator of authoritative cluster view changes to the cluster. Thus, when a new member is discovered, or an existing member is shutdown, abnormally terminates, or is otherwise not in communication with other members of the cluster, master node 308 is arranged to provide such information to other cluster members as the cluster authority.

Master node 308 may be initialized by cluster manager 306, and during startup, may engage in determining whether a master node already exists within a cluster. If no master currently is determined to exist, master node 308 may be configured to enable network device 200 to assert itself in a master role. If multiple nodes assert themselves as master to the same cluster, then cluster view advertisements may be shared between members to identify a master node for the cluster. While selection of the master may be based on a variety of criteria, in one embodiment, selection of the master may be determined as that node listed within cluster view advertisements at a beginning of a sorted list of system advertisements (within the cluster view advertisements). It should be noted, while a master node may be determined using the disclosed mechanism, a backup master, or the like, may also be identified using a substantially similar mechanism. One embodiment of a process for selecting a master node is described in more detail below in conjunction with FIG. 4.

System Advertisement 251 includes any component for storing and/or maintaining at least one system advertisement associated with a peer and/or node, or even a cluster. In one embodiment, the system advertisement may identify a service provided by a peer/node, the peer/node itself, or even a cluster of nodes. In one embodiment, an advertisement associated with the cluster provided by Cluster View 309 may also be included in System Advertisement 251. In another embodiment, the cluster advertisements may be stored and/or managed within cluster view advertisements 252.

Thus, in one embodiment, cluster view advertisements 252 is a cache, data store, or the like, configured to store a collection of system advertisements of all members in the cluster, along with other cluster information. Advertisements substantially similar to advertisement 602 of FIG. 6 may be included in System Advertisement 251, for example. In one embodiment, System Advertisement 251 may be a cache of advertisements associated with a plurality of UUIDs. In one embodiment, a cached advertisement may be marked as outdated and/or may be cleared from the cache based on a time-to-live parameter, or the like.

One embodiment of service component 255 is illustrated in more detail in FIG. 3. Thus, referring to FIG. 3 for components 300, service component 255 includes discovery 302, health monitor 303, and network manager 304, although more or less components may be included with service component 255, without departing from the scope of the invention.

Network Manager 304 includes any component for providing automatic configuration and/or naming of nodes in a cluster. In one embodiment, Network Manager 304 may provide an interface to an underlying P2P service, may configure various aspects of the P2P service, or the like. In one embodiment, Network Manager 304 may provide an interface to a JXTA service. Network Manager 304 interfaces may build JXTA's Platform Configuration document, and may provide this core communications manifest to the JXTA service. However, the invention is not limited to P2P services, and other network interface services may also be employed.

In one embodiment, Network Manager 304 may create a UUID based on a string based name, may create an associated advertisement, or the like. In one embodiment, Network Manager 304 may send a string based name to the P2P service, or other network service, to generate the UUID.

In one embodiment, given an instance and cluster name for a node, Network Manager 304 may use a SHA-1 hash to generate a Cluster ID (CID), and Node ID (a UUID). In another embodiment, the cluster name may not be known, and thus only the Node ID may be generated. In addition, Network Manager 304 may also define a set of predefined communication unique IDs for a node, which may be used for formation, monitoring, messaging, or the like. Network Manager 304 may also receive additional configuration parameters, such as bootstrapping addresses to facilitate cross subnet and firewall communication, or the like. These predefined communication unique IDs and/or parameters may also be encoded and/or may be associated with the Node ID and/or Cluster ID in an advertisement. In any case, Network Manager 304 may provide the created information to System Advertisement 251 and/or cluster view advertisement 252 for storage and/or further processing.

Discovery Component 302 includes any component for providing discovery of the existence, identity, and/or advertisement of nodes in a cluster. In one embodiment, Discovery Component 302 may interface with JXTA's Discovery Service and/or may receive notification of node discovery, advertisement discovery, or the like. In one embodiment, Discovery Component 302 may publish a node's advertisement using a distributed hash table (DHT) function, multi-casting, or the like. Discovery Component 302 may also receive a UUID query, and may return an advertisement associated with the UUID. Discovery Component 302 may use a variety of mechanisms, including caching, discovery requests, or the like to provide the associated advertisement. Discovery Component 302 may provide discovered advertisements to System Advertisement 251 (e.g., for caching). If Discovery Component 302 discovers that a node associated with an advertisement has failed or shutdown, then Discovery Component 302 may remove the advertisement from cluster view advertisement 252. In one embodiment, Discovery Component 302 may publish discovered advertisements and/or changes to the status of advertisements (e.g., outdated, or invalid) to at least one peer in a peer group and/or one node in a cluster of nodes. In one embodiment, Discovery Component 302 interfaces with a P2P naming, or similar, and communication mechanisms to manage advertisements.

While Discovery component 302 handles the planned entrance and planned exit of member nodes from a cluster, Health Monitor 303 manages abnormal termination or unavailability of members. In one embodiment, Health Monitor 303 may monitor the cluster's members and/or may determine whether the members have become unresponsive. In one embodiment, if a member node becomes unresponsive, Discovery component 302 may enable removing the member node from a cluster view; elect a new master node, or the like.

Health monitor 303 may include at least two functional aspects, a self reporting aspect and a member monitoring aspect. That is, in one embodiment, the self reporting aspect provides each member to publish a keep alive or an ALIVE state message to the cluster group, typically at periodic intervals. The periodic interval may be specified by employing an application during initialization through cluster manager 306, or the like. In one embodiment, the ALIVE state message may be encapsulated through an entity, sometimes called a health message. The health message may employ a structure that identifies the sending member's UUID, a state and time stamp of that state, and so forth. In one embodiment, the health message includes a cluster ID. In one embodiment, the contents of the health message may be cached on each member at a receiving end.

Health monitor 303 may also monitor the health of other members to determine whether ALIVE messages from the other members are received within a timeout period. In one embodiment, health monitor 303 may employ a process such as described below in conjunction with FIG. 5 to perform at least some of its actions.

It should be noted that cluster management component 254 and/or service component 255 may communicate over a network using a plurality of communication mechanisms including UDP, TCP/IP, HTTP, RTSP, application defined protocols, or the like.

As described above, cluster protocols, network communication protocols, and the like, may use advertisements to describe and publish a configuration of a network resource (e.g., node, peer, or the like). In one embodiment, advertisements may include virtually any structured language neutral metadata that names, describes, and/or publishes an existence of a network resource. In one embodiment, an advertisement may comprise a markup language document such as an XML document, or virtually any data configured to be read and parsed for information. An advertisement may be associated with a UUID that identifies the resource, including a cluster (or associated with a CID). The advertisement may include characteristics of the identified resource, including hardware and/or software configurations, CPU load, provided communication protocols, preferred communication protocols (e.g., under which resources/peers may communicate with each other), or the like. Examples of the use of advertisements, especially within the context of P2P networks are described in more detail in U.S. Pat. No. 7,065,579, "System using peer discovery and peer membership protocols for accessing peer-to-peer platform resources on a network" to Traversat, et al., which is incorporated herein by reference.

As mentioned, FIG. 6 illustrates embodiments of various advertisements usable within a cluster network. Advertisements 600 includes system advertisement 602 and cluster view advertisement 604. Advertisements 600 may include many more components than those shown. The components shown, however, are sufficient to disclose an illustrative embodiment for practicing the invention.

As shown, system advertisement 602 may include but not be limited to such information fields, such as name, keywords, node identifier, service, endpoints, initial applications, or the like. A name field may include an optional string that may be associated with a node. In one embodiment, the name is not required to be unique. Keywords include optional strings that may be used to index and search for a node on a network. In one embodiment, the string need not be unique. The node identifier is created to uniquely represent the node. In one embodiment, the node identifier is the UUID described above. The service element may describe services started on a node. In one embodiment, not all services running on a node need to be published. The service may be provided over an OSI level 2 or above protocol (e.g., UDP, TCP/IP, HTTP, RTSP, and FTP). Endpoints include addresses through which a node may be accessed. For example, an endpoint may include URI, HTTP, TCP, UDP addresses, or the like.

Information within advertisement 602 may also define the methodology for propagating messages. Other fields may also define other properties for the node, including operating system type, operating system version, CPU load, bandwidth load, hardware and/or software configuration, port numbers, failure detection timeouts, or the like. Moreover, initial applications describe those services or resources that may be started on a node.

As shown, cluster view advertisement 604 may include but not be limited to such information as name, keywords, cluster ID (CID), services, initial applications, or the like. CID provides a unique identifier to a cluster, while services may include access information to system advertisements for nodes within the cluster. Name, keywords, and initial applications may include substantially similar information as described above, but oriented towards a cluster.

Generalized Operation

Figure 4:
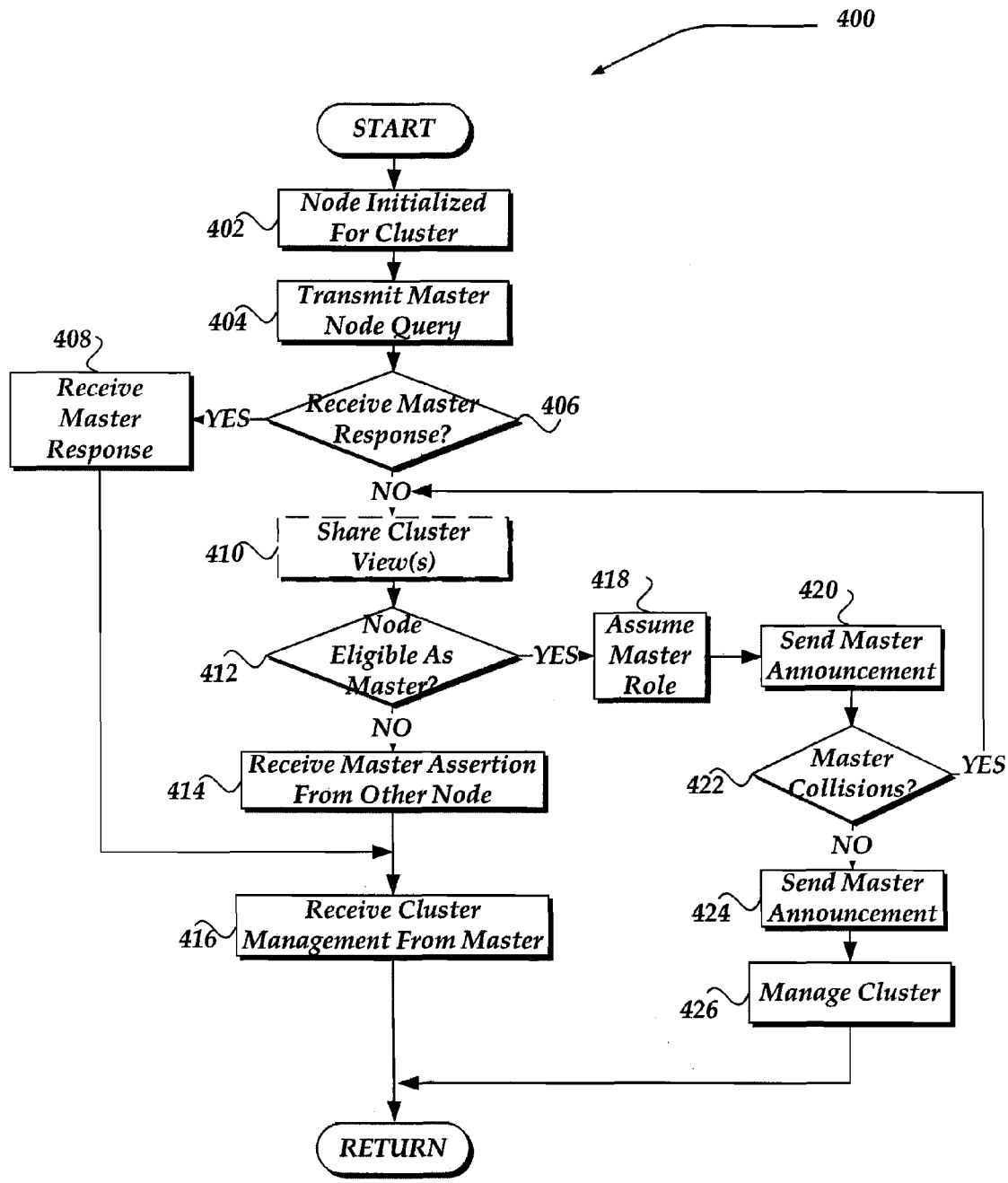
FIG. 4 illustrates a logical flow diagram generally showing one embodiment of a process for selecting and managing a master node for a cluster network.

The operation of certain aspects of the invention will now be described with respect to FIG. 4. FIG. 4 illustrates a logical flow diagram generally showing one embodiment of a process for selecting and managing a master node for a cluster network. Process 400 may be implemented within nodes 104-106 of FIG. 1.

As shown, process 400 begins, after a start block, at block 402, where a node is initialized. As discussed above, in one embodiment, the node may be initialized through a cluster manager component. When the node is initialized, such as during a startup, or the like, the node may perform a discovery action to determine whether a master is already defined for a cluster. A discovery action is typically directed towards, among other things, learning about other resources on the network, and may include sending query messages over the network, and receiving a response to the query from various resources.

Thus, processing continues to block 404, where the node may send out a master node query message to other nodes on the network. In one embodiment, the query message may include a cluster ID. In one embodiment, the query message may include system advertisement information, or other information about the querying node.

In one embodiment, the query message may be sent using a broadcast communications protocol. In any event, when the master node query message is received by other nodes, they may update their own cluster view advertisements to include information about the querying node. Processing then flows to decision block 406, where the querying node waits for a response to the query message. In one embodiment, the querying node might wait a predefined time period before determining whether a master node responds to the query. That is, in one embodiment, the querying node might monitor for a master node response message, or the like, from the master node for the cluster. Thus, at decision block 406, if no master node response is received within the time period, then processing flows to block 410; otherwise, processing flows to block 408.

At block 408, a master node response is received. In one embodiment, the master node response may include a cluster view advertisement that includes information about the querying node, as well as other nodes within the cluster. Processing flows next to block 416.

At block 410, if no master node response is received, the querying node that is in discovery mode, may consult a cluster view to determine the master candidate. This may be performed, for example, based on receiving cluster view advertisements, system advertisements, or the like, from other nodes. In one embodiment, the querying node may then coalesce these cluster view advertisements, or the like, into a single sorted list of nodes. In one embodiment, the list may be sorted by UUIDs of each of the responding nodes. The sorted list may then be used to identify the candidate master node. In one embodiment, the candidate master node is that node associated with the first UUID in the list. Thus, sorting of the list may be performed from lowest UUID to highest, such that the lowest UUID is the first on the list. However, the list may also be sorted using a variety of other algorithms, including from highest UUID to lowest, or the like. The invention is not limited however to these sorting examples, and any of a variety of other sorting algorithms may be employed, without departing from the scope of the invention.

Where the querying node is the only member in the cluster, such as might arise when the cluster is initially being formed, or the like, then the master candidate node is deterministically the querying node—and there may be no received cluster view advertisements received from other nodes.

Thus, process 400 moves to decision block 412, where a determination is made whether the querying node is a candidate master node. If so, processing flows to block 418; otherwise, processing flows to block 414.

At block 418, if the querying node is a candidate master node, the node assumes the master role. Processing then flows to block 420, where the node send out an announcement to the other members of the cluster indicating that it is asserting itself as in the master role for the cluster. This announcement is received by all the member nodes within the cluster, which may then perform a check with themselves to look for any possible duplicate masters. Such event may arise, for example, during initial formation, or reformation, of a cluster, where multiple nodes may enter discovery at virtually the same time, to search for a master node to a cluster. It may also arise, where, for any of a variety of reasons, sharing of cluster view advertisements, system advertisements, or the like, may be incomplete between members within the cluster. Thus, for example, a coalescing of views for sorting may not include information about all of the members for the cluster from one or more of the members. That is, one node might have an incomplete cluster view. Thus, processing flows next to decision block 422, where a determination is made whether another member may be attempting to also assert itself as the master node for the cluster. If this arises, then the querying node, or the other member, or any other member to the cluster may send a master node collision message indicating that multiple nodes seek to become the master to the cluster. In one embodiment, the collision message may indicate that resolution is requested.

If there is a collision message received, then processing branches back to block 410, where cluster views are updated and shared between the cluster members. In this manner, the nodes are provided another opportunity to obtain a more current cluster view listing of nodes within the cluster. The master node(s) receiving the collision message may then loop back through decision block 412 to determine whether it is the proper candidate master node. If the querying node is the master node, processing flows back through to decision block 422 again, where the process may be repeated until there are no further master collision messages.

Thus, if there are no further collision messages, processing flows from decision block 422 to block 424, where the master node sends out an announcement to the cluster members that it is indeed the master node. In one embodiment, the announcement may be in the form of a master node response message. In such a situation, the other nodes may then accept the new master node as the master to the cluster. Thus, processing flows to block 426, where the master node then manages the cluster. Processing for master node selection then returns to perform other actions.

At decision block 412, however, where the querying node is determined not to be first in the sorted list, then processing flows to block 414, where the identified node sends a master assertion message. Process 400 then moves to block 416, where the querying node receives cluster management directions from the new master node. It should be noted, that while the querying node might not be involved, there might still have been master collision messages sent between members within the cluster. Such collisions would then be resolved, as described above, by updating and sharing the cluster view advertisements of each member, having each candidate master node coalescing their shared views, and examining their sorted lists to identify the proper master node.

The master node may then delegate jobs of disseminating authoritative views of the cluster to a publisher thread within the master node. The master node may further listen for any changes to the cluster. When such a view change event occurs, the master node gets notified of the event. The master node may then mark the event, and send the updated authoritative cluster view to members of the cluster. In any event, after block 416, process 400 returns to a calling process to perform other actions.

Figure 5:
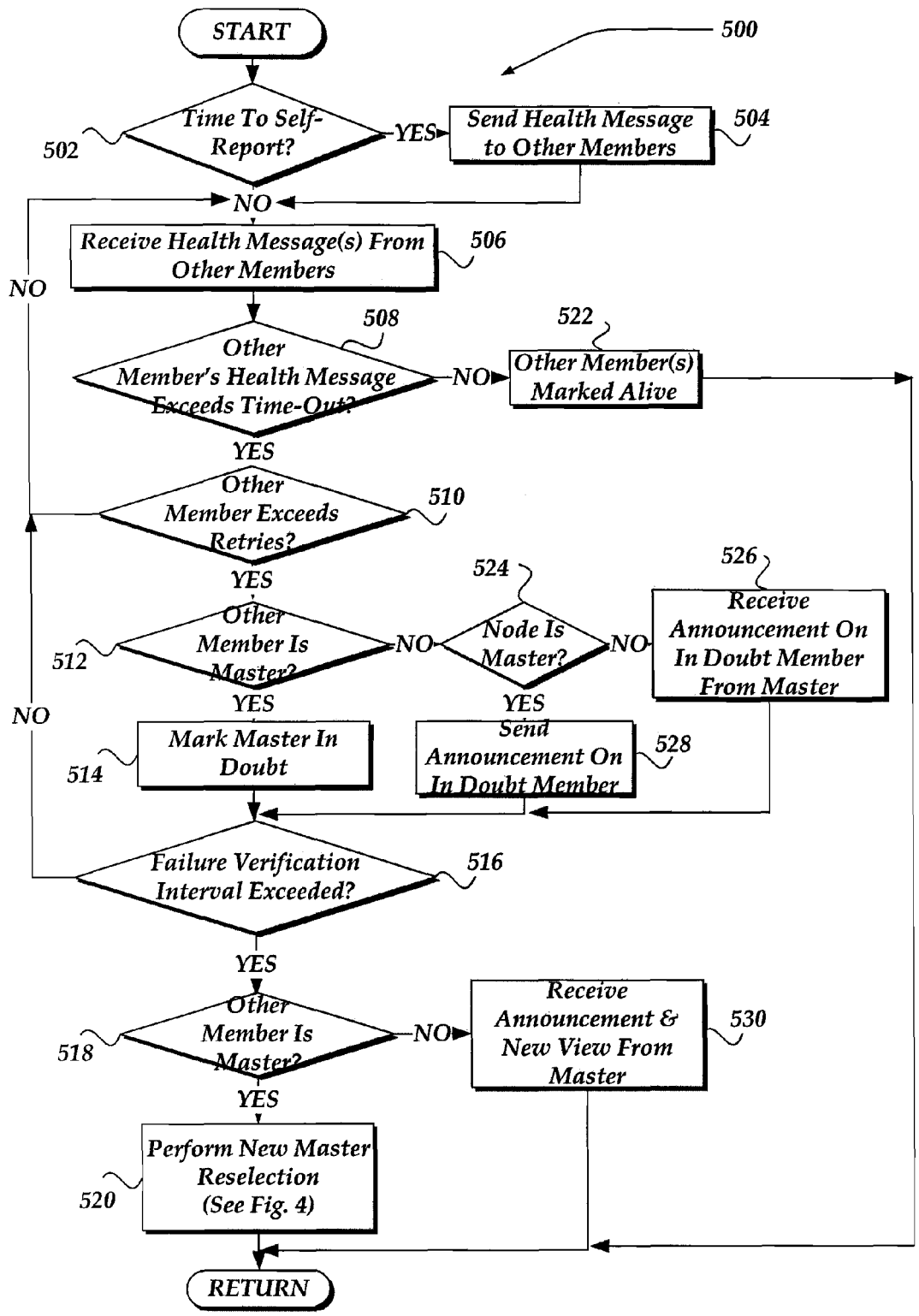
FIG. 5 illustrates a logical flow diagram generally showing one embodiment of a process for monitoring health of a cluster network.

FIG. 5 illustrates a logical flow diagram generally showing one embodiment of a process for monitoring health of a cluster network. Process 500 of FIG. 5 may be implemented within nodes 104-106 of FIG. 1.

Process 500 begins, after a start block, at decision block 502, where a determination is made whether the node is to perform a self-report. Such self-reports are directed towards letting other nodes within the cluster know that the node is currently active, and in communication. Typically, these self-reports are provided to other nodes within a defined timeout interval. In one embodiment, the timeout interval may be on an order of milliseconds, however the invention is not limited to such intervals, and others may also be selected. In any event, if a self-report is to be transmitted, processing flows to block 504; otherwise, processing flows to block 506. At block 504, the health message as described above is communicated over the network to the other nodes within the cluster. Processing next flows to block 506.

At block 506, health messages may be received from other nodes within the cluster. It is expected that similar to self-reports, these health messages are also transmitted at a defined periodic interval. In one embodiment, received health messages may be placed in cache, or another memory store, for periodic review by the receiving node. The review is directed towards determining whether another node's health message was either not received, or otherwise failed to be received within a specified timeout interval. If either is the case, then processing flows to decision block 510; otherwise, if a health message is received for each node with the cluster within the specified timeout interval, then processing flows to block 522, where the receiving node may identify in a record, table, spreadsheet, document, or the like, that each node is alive. Processing then may return to a calling process to perform other actions.

At decision block 510, a determination is made to continue to track any in-doubt nodes for a number of retries. The number of retries may be virtually any number; however, typical values range between zero and ten. It should be noted, that the responsive other nodes, however, may be identified within a record, table, spreadsheet, document, or the like, as being alive. If at decision block 510, it is determined, however, that the number of retries have not been exceeded for the non-responsive node, processing may loop back to block 506, to monitor for receipt of a health message from the non-responsive node. Otherwise, if the number of retries has been exceeded, processing flows to decision block 512.

At decision block 512, a determination is made whether the non-responsive node is the master node to the cluster. If so, processing flows to block 514; otherwise, processing continues to decision block 524. At decision block 524, a determination is made whether the receiving (monitoring) node is the master node for the cluster. If so, processing flows to block 528; otherwise, processing flows to block 526. At block 526, an announcement may be received from the master node for the cluster indicating that the non-responsive node is in an INDOUBT state, indicating that that node may be at least temporarily inaccessible. Processing then flows to decision block 516. Alternatively, at block 528, the receiving (monitoring), being the master node, may then send to the other nodes within the cluster the INDOUBT state message for the non-responsive node. Processing flows to decision block 516.

At decision block 516, a determination is made whether a predefined failure verification interval is exceeded for the INDOUBT node. If not, then processing may loop back to block 506, to continue to monitor for an updated health message from the INDOUBT node. Otherwise, if the predefined failure verification interval is exceeded, processing flows to decision block 518, where a determination is made if the INDOUBT node is the master node for the cluster. If so, processing flows to block 520; otherwise, processing flows to block 530.

At block 530, because the INDOUBT node is not the master to the cluster, it is expected that the master node will send, and the receiving (monitoring) node receives an announcement, including a new authoritative cluster view advertisement, indicating that the INDOUBT node is failed. In one embodiment, the new cluster view advertisement might no longer include information about the failed node. Processing then returns to the calling processing to perform other actions.

If, however, at block 520, where the INDOUBT node (now determined to be a failed node) is the master node for the cluster, then a new master for the cluster is selected, and that new master node is expected to send out a new authoritative view for the cluster. In one embodiment, selection of the new master may be determined using process 400 of FIG. 4 described above.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network computing device for managing a cluster network, comprising:
   a processor;
   a memory for use in receiving and managing data and instructions that, when executed by the processor performs a method, the method comprising:
      examining a first view of the cluster network to identify a candidate master node for the cluster network based on a sorted order of cluster member identifiers within the first view;
      when the network computing device is identified as the candidate master node, sending an announcement to other cluster members of the cluster network indicating that the network computing device is a first asserted master node; and
      upon detecting a master collision, wherein the master collision indicates a second asserted master node:
         obtaining a first updated cluster view of the cluster network from each of the cluster members of the cluster network,
         coalescing the received updated cluster views to obtain a second view of the cluster network, sorting the cluster member identifiers within the second view of the cluster network to obtain a sorted second view of the cluster network, and identifying a master node based on the sorted second view of the cluster network.

2. The network computing device of claim 1, wherein the method further comprises:

sending a master node query message over the cluster network to determine if the master node already is identified; and when a master response is received within a defined time period, receiving at least one authoritative cluster view from the master node for the cluster network, wherein the authoritative cluster view comprises information about the networking computing device, and identifies the master node.

3. The network computing device of claim 1, wherein identifying the candidate master node is based on a first cluster member identifier within the sorted second view of the cluster network.

4. The network computing device of claim 1, wherein sorting the cluster member identifiers comprises one selected from a group consisting of sorting from lowest to highest identifiers and sorting from highest to lowest identifiers.

5. The network computing device of claim 1, wherein the method further comprises:

receiving a health message from a first cluster member of the cluster network;

determining that the health message indicates that the first cluster member within the cluster network is failed, determining that the network computing device is not the master node, and obtaining an updated authoritative cluster view from the master node that excludes information about the first cluster member.

6. The network computing device of claim 1, wherein the processor configured to execute the instructions, and performed actions, further including:

when the master collision is undetected, sending an announcement that the network computing device is the master node for the cluster network; and assuming a cluster management role for the cluster network, including at least sending one authoritative cluster view to other cluster members of the cluster network.

7. The network computing device of claim 1, wherein the method further comprises:

receiving a health message from a first cluster member of the cluster network;

determining that the health message indicates that the master node is failed, receiving a second updated cluster view from each of the other cluster members of the cluster network;

coalescing and sorting the received second updated cluster views to generate a third cluster view; and employing the third cluster view to identify a new candidate master node for the cluster network.

8. The network computing device of claim 1, wherein the first updated cluster views are received using a cluster view advertisement.

9. The network computing device of claim 1, wherein the cluster member identifiers are generated using a secure hash algorithm based on the string based name for a cluster member.

10. The network computing device of claim 1, wherein the first cluster view comprises at least an identifier for the cluster network, and at least one cluster member identifier.

11. The network computing device of claim 1, wherein the method further comprises:

monitoring for health messages from other members within the cluster network;

when a health message is not received within a defined time period for a cluster member, and the network computing device is the master node for the cluster network, sending a message to the other cluster members of the cluster network indicating that the cluster member is in doubt; and when a failure verification interval is exceeded for the cluster member, sending an authoritative cluster view to the other cluster members of the cluster network indicating the cluster member in doubt has failed.

12. A computer readable medium comprising computer readable code for managing a network cluster that, when executed by a processor is configured to employ a method, the method comprising:

examining a first view of the cluster network to identify a candidate master node for the cluster network based on a sorted order of cluster member identifiers within the first view;

when the network computing device is identified as the candidate master node, sending an announcement to other cluster members of the cluster network indicating that the network computing device is a first asserted master node; and upon detecting a master collision, wherein the master collision indicates a second asserted master node, obtaining a first updated cluster view of the cluster network from each of the cluster members of the cluster network, coalescing the received updated cluster views to obtain a second view of the cluster network, sorting the cluster member identifiers within the second view of the cluster network to obtain a sorted second view of the cluster network, and identifying a master node based on the sorted second view of the cluster network.

13. The computer readable storage medium of claim 12, the method further comprising:

receiving a health message from a first cluster member of the cluster network;

determining that the health message indicates that the master node is failed, receiving a second updated cluster view from each of the other cluster members of the cluster network;

coalescing and sorting the received updated cluster views to generate a third cluster view; and employing the third cluster view to identify a new candidate master node for the cluster network.

14. The computer readable storage medium of claim 12, wherein the first cluster view comprises at least an identifier for the cluster network, and at least one cluster member identifier.

15. The computer readable storage medium of claim 12, wherein the first updated cluster views are received using a cluster view advertisement.

16. The computer readable storage medium of claim 12, wherein sorting the cluster member identifiers comprises one selected from a group consisting of sorting from lowest to highest identifiers, and sorting from highest to lowest identifiers.

17. A system for use in managing a cluster, comprising:

a first node that is configured to perform actions, including:

examining a first view of the cluster network to identify a candidate master node for the cluster network based on a sorted order of cluster member identifiers within the first view;

when the first node is identified as the candidate master node, sending an announcement to other cluster members of the cluster network indicating that the first cluster member is a first asserted master node; and upon detecting a master collision, wherein the master collision indicates that another cluster member is a second asserted master node, receiving an updated cluster view of the cluster network from each of the cluster members, coalescing the received updated cluster views with the first node's cluster view into a second cluster view, sorting the identifiers within the second cluster view to obtain a sorted second view of the cluster network, and identifying a first master node based on the sorted second view of the cluster network; and a second node that is configured to perform actions, including:

examining a third view of the cluster network to identify the candidate master node for the cluster network based on a sorted order of cluster member identifiers within the third view; and when the second node is identified as the candidate master node, and the first node is the first asserted master node, then:

sending a master collision message to the first node;

sending the third view of the cluster network to the first node;

receiving the second view from the first node;

coalescing the second view and the third view to obtain a fourth view, sorting the identifiers within the fourth view to obtain a sorted fourth view of the cluster network, and identifying the master node based on the sorted fourth view of the cluster network.

18. The system of claim 17, wherein the cluster network employs a peer-to-peer architecture.

19. The system of claim 17, wherein the first node and the second node monitor for health messages from members within the cluster network, and if a cluster member node is determined to be failed, receiving from the identified master node an authoritative cluster view of the cluster network that excludes the failed cluster member's identifier.

20. The system of claim 17, wherein one selected from a group consisting of the first node and the second node, during initialization into the cluster network, transmits a master node query to determine if an existing master node is already identified for the cluster network, wherein the identification of the existing master node is determined, at least in part, based on receiving a master response to the query within a defined time period.

\* \* \* \* \*